US008763116B1

(12) United States Patent
Khanna et al.

(10) Patent No.: US 8,763,116 B1
(45) Date of Patent: *Jun. 24, 2014

(54) DETECTING FRAUDULENT ACTIVITY BY ANALYSIS OF INFORMATION REQUESTS

(75) Inventors: Richendra Khanna, Seattle, WA (US); Sean C. Harding, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/163,526

(22) Filed: Jun. 17, 2011

Related U.S. Application Data

(63) Continuation of application No. 11/539,076, filed on Oct. 5, 2006, now Pat. No. 7,984,500.

(51) Int. Cl.
*H04L 29/06* (2006.01)
(52) U.S. Cl.
USPC .............................. 726/22; 709/225
(58) Field of Classification Search
USPC ............................... 726/22; 709/225
See application file for complete search history.

(56) References Cited

U.S. PATENT DOCUMENTS

| | | | | |
|---|---|---|---|---|
| 2006/0101334 | A1* | 5/2006 | Liao et al. | 715/523 |
| 2006/0253584 | A1* | 11/2006 | Dixon et al. | 709/225 |
| 2007/0074119 | A1 | 3/2007 | Komine et al. | 715/743 |
| 2007/0174630 | A1* | 7/2007 | Shannon et al. | 713/183 |
| 2009/0055642 | A1* | 2/2009 | Myers et al. | 713/155 |

OTHER PUBLICATIONS

Zhang, "Web Phishing Detection Based on Page Spatial Layout Similarity", Jul. 8, 2013, Informatica, p. 231-244.*
"E-Retail," Quova, retrieved Mar. 9, 2007, from http://www.quova.com/page.php?id=35, 1 page.
"Fraud Detection & Prevention," Quova, retrieved Mar. 9, 2007, from http://www.quova.com/page.php?id=8, 1 page.
"IBM Proventia Network Anomaly Detection System (ADS)," retrieved Mar. 9, 2007, from http://www.iss.net/products/Proventia_Network_Anomaly_Detection_System/product_main_page.html, 2 pages.
"Solutions" 41$^{st}$ Parameter, downloaded Mar. 9, 2007, from http://www.the41st.com/site/solutions.html, 1 page.
"VeriSign Identity Protection: VIP Fraud Detection Service," VeriSign, retrieved Mar. 9, 2007, from http://www.verisign.com/products-services/security-services/identity-protection/fraud-detection.html, 1 page.

* cited by examiner

*Primary Examiner* — David Pearson
*Assistant Examiner* — Gregory Lane
(74) *Attorney, Agent, or Firm* — Seed IP Law Group PLLC

(57) ABSTRACT

Techniques are described for use in inhibiting attempts to fraudulently obtain access to confidential information about users. In some situations, the techniques involve automatically analyzing at least some requests for information that are received by a Web site or other electronic information service, such as to determine whether they likely reflect fraudulent activities by the request senders or other parties that initiate the requests. For example, if a request is being made to a Web site based on a user's interaction with a third-party information source (e.g., another unaffiliated Web site) that is not authorized to initiate the request, the third-party information source may be a fraudulent phishing site or engaging in other types of fraudulent activity. If fraudulent activity is suspected based on analysis of one or more information requests, one or more actions may be taken to inhibit the fraudulent activity.

26 Claims, 12 Drawing Sheets

Example Fraud Assessment Tests

```
User-agent    - 205
    If missing = 3  - 207

Host     - 210
    '\d{3}\.\d{3}\.\d{3}\.\d{3}' = 5    - 212
```

Fig. 2A

```
Referer    - 220
    Set of Hostname-based tests    - 225
        '^(www|secure|payments)\.merchantlll\.(com|co\.uk|de|jp|ca|fr)[\.-].*$' = 3
        '-merchantlll\.com$' = 4
        'merchantlll\.co(m|\.)' = 4
        'merchantlll-com' = 3.5
        'merchantlll[\.-](?!com)' = 3
        'merchantlll[^\.-]' = 2.5
        'update' = 1
        '\d{10,}' = 3
        '\d{3}\.\d{3}\.\d{3}\.\d{3}' = 1.5
        '^(webmail|mail)\.' = -3

Set of URL Path-based tests    - 235
        '\d{3}-\d{3}-\d{3}' = 2
        'merchantlll\.co(m|\.)' = 1.5
        'verify' = 2
        'login' = 1.5
        'update' = 1
        'security' = 1
        'sign-in-secure' = 5
        '\/~' = .5

Set of Query String-based tests    - 245
        '(url|dest)=' = -3
        'pass' = .5
        'password' = 1
        'login' = 1
        '(?:(?!de)..|^.?)(signin|sign-in)(?!g)' = 1

Set of full URL tests    - 255
        '[\?\/\&]update\.php' = 5
        '\.php\?exec\/|\.php\?help\/' = 7
        'merchantlll(signin|sign-in|login)' = 10
```

Example Filtering Criteria

Whitelist of Referral URLs:    - 265
    www.partneraaa.com
    www.affiliatebbb.com
    searchengineccc.com Blacklist of Referral URLs:    - 270
    merchant111.fraudaaa.com Whitelist of Approved User-Agents:   - 275
    SearchEngineCCCBot

*Fig. 2B*

```
GET /help/faq.html HTTP/1.1
...
Host: www.merchant111.com
User-Agent: Mozilla/5.0 (Windows; U; Windows NT 5.1; en-US; rv:1.8.0.6) Gecko/20060728
     Firefox/1.5.0.6
Referer: http://www.update.examplephisher.com/merchant111.com/update.aspx
```

*Fig. 2C*

```
GET /privacy.html HTTP/1.1
...
Host: www.merchant111.com
User-Agent: Mozilla/4.0 (compatible; MSIE 6.0; Windows NT 5.1; SV1)
Referer: http://www.merchant111-update.fraudulentYYY.net/login/sign-in-secure.html?action
       =login
```

*Fig. 2D*

```
GET /privacy.html HTTP/1.1
...
Host: www.hellomerchant.com
User-Agent: SearchEngineCCCBot
Referer: http://www.blogMMM.com/091605.html
```

*Fig. 2E*

```
GET /orders/view.html
...
Host:www.merchant111.com
User-Agent: Mozilla/5.0 (Windows; U; Windows NT 5.1; en-US; rv:1.8.0.6) Gecko/20060728
    Firefox/1.5.0.6
Referer: http://webmail.ispGGG.com/go.php?url=http%3A%2F%2Fwww.merchant111.com%2Forders
    %2F view.html
```

*Fig. 2F*

DETECTING FRAUDULENT ACTIVITY BY ANALYSIS OF INFORMATION REQUESTS

CROSS-REFERENCES TO RELATED APPLICATIONS

This application is a continuation of co-pending U.S. patent application Ser. No. 11/539,076, filed Oct. 5, 2006 and entitled "Detecting Fraudulent Activity by Analysis of Information Requests", which is hereby incorporated herein by reference.

TECHNICAL FIELD

The following disclosure relates generally to techniques for inhibiting unauthorized activities, such as by inhibiting attempts for unauthorized access to confidential information associated with users based on analysis of information requests related to the users.

BACKGROUND

The Internet comprises a vast number of computers and computer networks that are interconnected through communication links, with information being exchanged using various services such as electronic mail, FTP, and the World Wide Web (or "Web"). The Web allows a server computer system (e.g., a Web server providing a Web site) to send graphical Web pages of information to a remote client computer system, which the remote client computer system can then display, such as via a Web browser executing on the client computer system.

In addition to merely providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online merchant or retailer or electronic marketplace that provides one or more items, such as to view information about the items, give an instruction to place an order for one or more items, and provide information needed to complete the purchase (e.g., payment and shipping information). After receiving an order for one or more items, a Web merchant then fulfills the order by providing the ordered items to the indicated recipient. The items may be products that are delivered electronically to a recipient (e.g., music downloaded over the Internet) or through physical distribution channels (e.g., paperback books shipped via a governmental postal service or private common carrier). The items may also be services that are provided either electronically (e.g., providing email service) or physically (e.g., performing cleaning services at the house of the purchaser). The order fulfillment process typically used by Web merchants for product items that are to be physically provided shares similarities with other item ordering services that ship ordered items (e.g., catalog-based shopping, such as from mail-order companies), such as to deliver ordered items from one or more physical distribution or fulfillment centers operated by or on behalf of the Web merchant.

While some services available via the Web or otherwise via the Internet may provide information and capabilities to anyone, many others have at least some information that is restricted to authorized users, such as to protect the privacy of confidential information related to users by making it available only to those users (e.g., to require a user to login to an email service before making the user's email available, to require a bank customer to login before making financial information available, etc.). Many such Internet services may further store various user data to assist functionality that is provided by the Internet service (e.g., for an online merchant to store shipping information for a user and information about financial instruments for a user to facilitate the user's shopping, such as in a manner associated with an account maintained for the user).

Since unauthorized access to such restricted information about users may provide various benefits to unscrupulous parties, such parties attempt to devise ways to gain access to the restricted information of the Internet services. For example, one popular technique, known as phishing, involves fooling unsuspecting victims into supplying login information and/or other personal information via a fraudulent Web site that masquerades as a legitimate Web site. In order to masquerade as the legitimate site, the party performing the phishing (referred to as a "phisher") may download various electronic information from the legitimate site (e.g., images, client-side scripts, CSS ("Cascading Style Sheets") files, etc.) to use in creating the fraudulent site. After creating the fraudulent site, the phisher will often send an email or other electronic communication disguised as being from the legitimate site, which prompts the intended victims to update and/or supply personal information in a way that directs the victims to the fraudulent site. Depending on the type of fraudulent site, some users may then be tricked into directly supplying confidential information to the fraudulent site, or instead may be tricked into supplying login information for the legitimate site to the fraudulent site that the phisher can then use to obtain confidential information for those users from the legitimate site by acting as those users. The confidential information obtained by the phisher may then be used to commit fraud in various ways. Unscrupulous parties may further use various other techniques to fraudulently obtain confidential information about users, including a technique known as "pharming" that involves redirecting a user from a legitimate site to a fraudulent one masquerading as the legitimate one in other ways.

Fraudulent activity, such as pharming and phishing, creates significant problems for both users of the Internet services and the Internet services themselves. For example, a bank or an online merchant may lose money when fraudulent transfers or charges are made. In addition, fraudulent activity may generate a significant number of calls (or other contacts) with customer service for the Internet services. Furthermore, even if an Internet service was not responsible for the loss of users' confidential information, users may nonetheless lose trust in the Internet service based on the fraudulent activity and be reluctant to continue interacting with the Internet service. For the users, identity theft may be perpetrated using the confidential information of the users, thus creating significant difficulties for the users.

Thus, it would be beneficial to inhibit various fraudulent activities related to unauthorized access to confidential information for users, as well as solve additional problems.

BRIEF DESCRIPTION OF THE DRAWINGS

FIGS. 2A-2F illustrate examples of using various fraud assessment tests to automatically analyze received requests for information.

DETAILED DESCRIPTION

Figure 1:
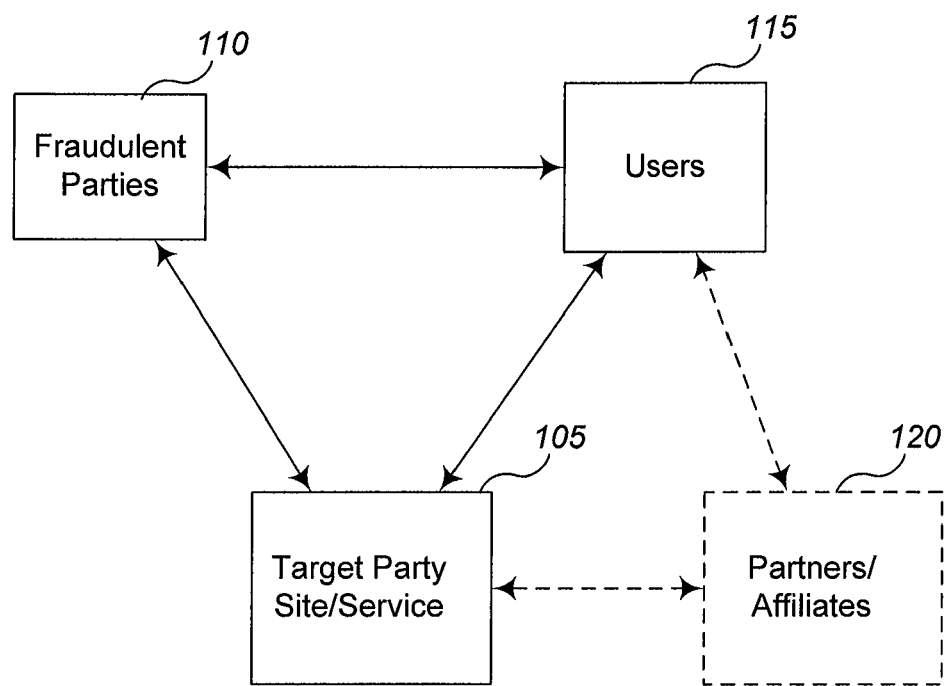
FIG. 1 illustrates example interactions involving users of Internet services.

Techniques are described for inhibiting attempts to fraudulently access confidential information about users. In some embodiments, the techniques involve automatically analyzing at least some requests for information that are received by a Web site or other electronic information service, such as to determine whether the received requests are likely to reflect fraudulent activities by the senders of the requests or by other third-parties that initiate the requests. For example, if a particular type of request is being made to a Web site (or other electronic information service) based on a user's interaction with a third-party information source (e.g., another Web site that is not affiliated with the Web site receiving the request), but the third-party information source is not authorized to cause that type of request to be initiated, the unauthorized request may represent the actions of a fraudulent phishing site or other type of fraudulent activity on the part of the third-party information source. If fraudulent activity is suspected based on analysis of one or more information requests, various actions may be taken to inhibit the fraudulent activity from continuing. In at least some embodiments, the described techniques are performed by an automated Fraudulent Activity Detector system, as described in greater detail below, such as to detect and inhibit attempts to fraudulently obtain access to information from one or more Web sites or other electronic information services.

In at least some embodiments, the automatic analysis for a request received from a user may be made based on assessing information associated with the request, such as an indication of a third-party information source with which the user was interacting to initiate the request (e.g., information indicating the domain name and other information associated with a Web page having a user-selectable link that prompts the request when selected by the user). The assessing of the information associated with a request may further be performed in various ways in various embodiments, including by using a variety of types of fraud assessment tests that may each analyze a particular portion of the information associated with the request and/or a particular type of fraudulent activity. For example, some requests to a target Web site for information may each include an indication of a third-party information source (e.g., a Web page from an unaffiliated Web site) that initiated the request, such as HTTP ("Hyper-Text Transfer Protocol") requests sent from a Web browser of a user. Such an HTTP request may include an HTTP referer field that indicates the address (e.g., the URL, or "Uniform Resource Locator") of a particular third-party information source resource that provides a URL for a target Web site resource, with the target Web site resource URL being used by the user's Web browser to generate the information request to the target Web site. The URL indicating the third-party information source may include, for example, a protocol, a port, the domain name (or "hostname") of the third-party information source, a host path specific to the third-party information source, and a query string that includes one or more query parameters and associated values. Some fraud assessment tests may then, for example, test each of one or more separate portions of such a third-party information source URL, such as to check for suspicious keywords in the domain name, host path and/or query string, while other fraud assessment tests may analyze the URL as a whole or may consider all portions of the URL. Other fraud assessment tests may instead analyze information for an information request other than the indication of a third-party information source that initiated the request.

The fraud assessment tests may take various forms in various embodiments, such as by using regular expression matching, or by detecting the absence of information that is expected. As one particular example, if an information request received by a target Web site is an HTTP request, the absence of an HTTP User-Agent request field or the absence of the domain name of the target Web site in the HTTP Host request field may each be factors that are believed to have at least some correlation with fraudulent activities. In addition, in some embodiments, at least some fraud assessment tests may be specific to the type of resource or other information requested. For example, if an image is requested from a target Web site (e.g., an image that shows the logo of the target Web site), there may be a fraud assessment test that checks the HTTP referer field for the request to determine if the request is initiated by a Web page of a Web site that is authorized to include the requested image, such as from the target Web site or from an affiliated Web site that is allowed to display the image (e.g., from an entity that is a partner of the entity operating the target Web site). As another example, additional fraud assessment tests may be used when an information request is related to confidential user information, such as a request for account information of a user or a request for a user login page to which user login information may be provided. Additional details related to fraud assessment tests and more generally to assessing requests for information are included below.

The determination of whether a received request for information may reflect fraudulent activity by the sender of the request or other party that initiated the request may be performed in various ways in various embodiments. In some embodiments, the results of multiple fraud assessment tests that are applied to assess the request may be aggregated in various ways to determine an overall assessment for the request. For example, each fraud assessment test that the request satisfies may cumulatively contribute to a total fraud assessment score for the request, which may then be compared to one or more fraud score thresholds (e.g., a constant threshold for all requests, or a threshold that is selected for the request being evaluated, such as in a manner specific to a type of the request). If the total fraud assessment score exceeds the selected threshold, the request may at least potentially reflect fraudulent activity, and one or more parties associated with the request may be categorized as being suspect (such as a third-party information source that caused the request to be initiated and/or a sender of the request, depending on the type of request and the type of fraudulent activity suspected). Furthermore, in some embodiments each fraud assessment test that is applied to assess a request may be associated with a particular weight, such as to allow a weighted overall assessment for the request. In addition, in some embodiments multiple degrees of likely fraudulence may be associated with a request based on the associated total fraud assessment score, such as based on multiple thresholds used with a particular request (e.g., with more extensive or severe types of corresponding actions taken for higher degrees of likely fraudulence). Furthermore, in some embodiments, the fraud assessment tests may include one or more tests that are associated with legitimate activity, such that satisfaction of a legitimate activity test may decrease an overall total fraud assessment score (e.g., by associating negative values and/or weights with such fraud assessment tests).

In some embodiments, the information requests may further be filtered before the automated analysis is performed, such as to exclude some requests from analysis. Such filtering may be based on various factors in various embodiments, such as at least in part on one or more of the following: the information requested (e.g., the type of information, such as information that is publicly accessible or that is not currently available); a third-party information source with which the user was interacting to initiate the request (such as may be indicated by an HTTP referer field used with the request, including in the form of an absolute URL or a relative URL), such as a third-party information source that is authorized to make the request or that was previously determined to be engaged in legitimate activities; the type of client-side application (or "user-agent") making the request, such as if the user-agent is a known search engine crawler robot, or is a particular type of Web browser that enforces enhanced security standards; the IP address of the sender of the request; and other information included with the request (e.g., cookies, an operating system of the requestor, such as to detect if the operating system is a sever operating system, etc.). In addition, in some embodiments, only a single request (e.g., a first request) from a group of related requests (e.g., multiple results from a particular user, IP address and/or associated third-party information source, such as within a particular period of time) may be analyzed, with the other related requests filtered. For example, at least some of multiple requests associated with downloading and displaying an entire Web page (such as for multiple images, CSS files, JavaScript files, etc.) may be filtered.

If fraudulent activity is suspected with respect to a particular third-party information source associated with one or more requests or a sender of one or more requests, one or more actions may be taken to inhibit the fraudulent activity. For example, for one or more requests that are associated with a particular suspect third-party information source and are sent by one or more users, the activities may include automatically freezing accounts of the users and/or notifying the users (e.g., based on the suspect third-party information source having potentially gained access to confidential information about the user, or to login or other access information that will allow the suspect third-party information source to access such confidential information in the near future). In addition, activities related to a suspect third-party information source and/or a suspect request sender may include taking activities to shut down that third-party information source or sender or to otherwise prevent that third-party information source or sender from continuing to engage in fraudulent activities. In some embodiments, the actions may also include providing information about the suspect third-party information sources or suspect senders to one or more humans for manual review, such as for each request associated with the suspect parties, or by aggregating information about multiple related requests and/or other related information about a suspect party before it is provided for manual review. Furthermore, in some embodiments, some or all of the requests may be analyzed in real-time (e.g., as the requests are received), while in other embodiments some or all of the requests are analyzed at a later time (e.g., based on information retrieved from log files that store information about some or all received requests). If performed at a later time, the requests may still be analyzed soon after receipt (e.g., within a few hours), such as to allow rapid detection and prevention of fraudulent activities.

FIG. 1 illustrates various types of interactions that may occur between users and electronic sites or information services, such as Web sites and other services available via the Internet or other communications networks (e.g., private cellular or landline telephone networks). In this example, a target party site or service 105 offers one or more online services (e.g., a Web store, online banking, payment processing, Web-based email, Web services, etc.) or other electronically accessible information to users 115, and may store confidential information (not shown) regarding the users that is available only to those users (e.g., via user accounts maintained by the target party site/service). The users 115 use client applications (e.g., Web browsers, not shown) executing on client computing systems (not shown) to access the online services or information from the target party site/service. In order for a user to obtain such access, the user makes one or more information requests to the target party site/service (e.g., requests based on the HTTP protocol from a Web browser of the user) for particular electronically accessible resources or other information available from the target party site/service (e.g., user account information, images, login pages, etc.). The target party may also in some situations interact with the users via other types of electronic communications (e.g., email, instant messaging, etc.). In some situations, the target party may also have one or more other business entities that are partners and/or affiliates 120 (e.g., based on contractual agreements), and the users may also optionally interact with the partners/affiliates to receive additional information and/or functionality. Partners and/or affiliates 120 may also interact with the target party 105 in various ways, including by making various types of authorized information requests to the target party (e.g., to retrieve various information from the target party for display or other use, such as product images to display, or address information for links to the target party site/service to be provided for selection and use by users). Similarly, the target party 105 may interact with the partners and/or affiliates in various ways.

In this example, one or more third-party fraudulent parties 110 (e.g., phishers, pharmers, identity theft perpetrators, etc.) may also be present and may attempt to obtain information about users of the target party site/service in various ways. For example, a fraudulent party may initially directly interact with the target party site/service 105 to retrieve information about the target party for use in furthering its fraudulent activities (e.g., to obtain information about Web pages or other information provided by the target party in order to enable the fraudulent party to masquerade as the target party, such as by creating a fraudulent Web site to replicate or mimic at least portions of a Web site provided by the target party). The initial interactions by the fraudulent party may include, for example, examining the design of various Web pages, examining the structure of the URLs ("Uniform Resource Locator") of various information resources available from the target party, retrieving images and other information from the target party, etc. After a fraudulent party obtains sufficient information about the target party, the fraudulent party may create one or more fraudulent sites or services (not shown) masquerading as the target party site/service 105, such as by using one or more Web development kits that can assist in such masquerading.

After creating a fraudulent third-party information source (e.g., a fraudulent site or service) intended to fraudulently obtain confidential information about users, the fraudulent party may then induce at least some of the users 115 to interact with the fraudulent third-party information source, such as by sending an electronic communication (e.g., email, instant message, automated telephone call, etc.) to one or more users with a link or other reference to the fraudulent third-party information source. The electronic communication may, for example, direct a user to click on or otherwise select a provided link to allegedly perform one or more activities with respect to the target party (e.g., update personal information, change passwords, etc.). When a user selects the link, the fraudulent site/service may then send information (e.g., a Web page) to the user that contains a form or other user interface to prompt the user to provide login information (e.g., username and password) or other personal information (e.g., financial information, contact information, medical information, etc.), such as in a manner that is intended to deceive the user into believing that the user is interacting with the target party site/service (e.g., by mimicking a visual appearance and/or functionality of the target party site/service). If the user directly supplies personal information, the fraudulent party 110 may then use that information for various fraudulent activities, such as to use obtained financial information for the user to purchase merchandise or open credit accounts, or to otherwise perform activities related to identity theft. If the user supplies login information, the fraudulent party 110 may then interact with the target party site/service by masquerading as the user (e.g., to access confidential information about the user for later use, or to perform various operations with the target party, such as buying merchandise or transferring money), as then may similarly further perform various additional fraudulent activities at other sites and/or offline.

The Web page or other information sent from the fraudulent site to a user may also include links to various content at the target party. For example, the provided information may not include all information for use by a Web browser of the user in rendering a Web page being provided by the fraudulent site, such as by including links or references to resources or information from the target site (e.g., images, JavaScript, CSS files, etc.) that are for automatic client-side retrieval by the Web browser. If so, the Web browser will automatically use such links/references to request those resources/information from the target party 105 on behalf of the user as part of presenting the provided information from the fraudulent site to the user. Furthermore, a fraudulent party may desire that the user not realize that the fraudulent site is not the target party site/service (e.g., so that the user does not take immediate action to prevent access to and/or use of any confidential information of the user), but may be unable or willing to fully reproduce all aspects of the target party site/service. Instead, the fraudulent party may desire to, after the desired information about the user is obtained, cause the user to commence further interactions with the target party site/service in a seamless manner. If the fraudulent party is successful, the user may never realize that the user temporarily interacted with a party other than the target party. Thus, the Web page or other information sent from the fraudulent site to a user may further include user-selectable links to particular information resources located at the target party site/service, such as, for example, links to privacy policies, help pages, current promotions, user account information, etc. Once a user selects one of these links, the fraudulent site may thus cause the user's Web browser to initiate a request to the target party for a new group of information (e.g., a new Web page to display), after which ongoing interactions by the user will be directly with the target party site/service (based on selections of additional links or other controls provided in the new group of information).

While not illustrated in this example, in some embodiments an automated Fraudulent Activity Detector system (not shown) may further be present in order to use the described techniques to detect some or all of the fraudulent activities by the fraudulent parties, and to inhibit those and related future fraudulent activities. Such a system may be, for example, executing on a target party's computing system(s) to analyze information requests received by the target party site/service, or may instead execute on one or more remote computing systems (not shown) to provide fraudulent activity detection services to multiple unaffiliated target parties, such as for a fee. Various embodiments of the Fraudulent Activity Detector system may analyze, for example, the information requests from users that are initiated by the fraudulent third-party information sources to direct the user to perform subsequent interactions with a target party, the information requests made by Web browsers on behalf of users to automatically retrieve target party information to be displayed along with other information from a fraudulent third-party information source, the initial requests by fraudulent parties to obtain information about the target party for later use in fraudulently interacting with users, the subsequent requests by fraudulent parties that use fraudulently obtained user information (e.g., login information) to access confidential information about the users from the target party, etc. Additional details regarding activities of embodiments of the Fraudulent Activity Detector system are included below.

For illustrative purposes, some embodiments are described below in which a particular type of target party detects particular types of fraudulent activity in particular ways, such as for target parties providing a target Web site or other electronic information service that phishers are fraudulently attempting to access. However, it will be appreciated that the described techniques may be used in a wide variety of other situations, including with other types of target parties and electronically accessible information or resources (e.g., Web services), by performing other types of automated assessment than based on fraud assessment tests, by using other types of filtering (e.g., other than whitelisting of known good parties and/or blacklisting of known fraudulent parties), by using protocols other than HTTP (e.g., instant messaging-based protocols, mail-based protocols, SIP (or "Session Initiation Protocol"), etc.), and in situations other than with a single target Web site. Thus, the invention is not limited to the exemplary details provided.

FIGS. 2A-2F illustrate examples of using various fraud assessment tests to automatically analyze received requests for information. In particular, FIG. 2A illustrates a number of example fraud assessment tests, and FIG. 2B illustrates examples of filtering criteria that may be used to exclude some information requests from analysis. FIGS. 2C-2F then illustrate examples of selected HTTP headers received by an example target party from remote client computers (e.g., from users' client computing systems or a fraudulent party's computing system). For illustrative purposes, an example target party online merchant (referred to here as "Merchant LLL") is used throughout the examples, with the merchant primarily using the "MerchantLLL.com" domain and also using a number of geographically specific domains (e.g., regional domains such as ".eu", or country code domains such as ".uk").

FIG. 2A illustrates a number of fraud assessment tests that have been determined to each be at least potentially associated with fraudulent activity and/or at least potentially associated with legitimate activity, such as based on a correlation of the subject matter of the tests to prior requests determined to be associated with fraudulent or legitimate activity (e.g., based on an automated and/or manual analysis of those prior requests, and optionally updated to reflect ongoing analysis and/or new fraudulent and legitimate parties that are identified). In this example, the fraud assessment tests are designed to analyze HTTP-based information requests, and most of the fraud assessment tests are based on use of regular expressions. In addition, in this example each fraud assessment test also has an associated weight, which in this example is a value that will be added to a cumulative fraud assessment score for a request if the test is satisfied for the request, although in other embodiments weights may not be used or may be used in other manners (e.g., with at least some tests producing a numeric value result, such as to indicate a degree of match of the test to the request, and with such test results being weighted by the associated weight for the test). As discussed in greater detail below, an embodiment of the Fraudulent Activity Detector system may use the fraud assessment tests to analyze received information requests in order to attempt to identify suspected fraudulent activity associated with the information requests.

The example fraud assessment tests illustrated in FIG. 2A analyze various portions of the HTTP headers for the received requests, and include a test 207 that analyzes the information in the HTTP User-agent field 205, a test 212 that analyzes the information in the HTTP Host field 210, and various tests 225, 235, 245, and 255 that analyze the information in the HTTP referer field 220. For example, the user-agent field test 207 analyzes if the user-agent HTTP header is missing. Since most Web browsers and legitimate Web crawling robots (or "bots") include a user-agent header field to indicate the type of client application submitting the request, an omitted user-agent header field (or a missing value for a field that is included) may reflect that a fraudulent party is downloading information to set up a fraudulent site, is using an automated bot to verify user login user information that was previously fraudulently obtained, is an unauthorized party trying to evade any robot exclusions under the robot exclusion standard, etc. In this example, the Host field test 212 is a regular expression (e.g., specified using Perl format) that analyzes the value for the Host field to determine if an IP address was supplied rather than the expected "www.merchantlll.com" domain name, which may reflect a potential pharming attack, as well as which may be used to determine whether to perform additional tests 225 based on a domain name in the Host field.

In this example, some of the fraud assessment tests 225, 235, 245, and 255 that analyze the information in the HTTP referer field 220 analyze specific parts of the URL value for the field (e.g., the domain name, URL host path, and URL query string), and other of the fraud assessment tests analyze the entire URL value. In other embodiments, additional parts of the URL (e.g., the protocol and port) may be analyzed, and some of the illustrated tests may not be performed. As previously noted, the URL value of the referer field 220 for a request is a URL associated with a third-party information source that initiated the request, such as by specifying a URL for a target Web site resource at a domain reflected in the Host field 210. The individual parts of the referer value URL may be determined by splitting the referer value string into substrings by performing parsing on the appropriate characters (e.g., by identifying the domain name (or "hostname") after an initial "//" and before a next "/"). In particular in this example, the fraud assessment tests 225, 235, 245, and 255 include a set of tests 225 based on the URL hostname 225, a set of tests 235 based on the URL host path (if any), a set of tests 245 based on the URL query string (if any), and a set of tests 255 that analyze the entire URL value.

In this example, some of the hostname-based tests 225 determine if various versions of the term "merchantlll" is included as part of the domain name of the referer value URL. If such a term is used by an third-party information source other than Merchant LLL, it may reflect an attempt to fraudulently deceive users that the third-party information source is the target Web site for Merchant LLL. In addition, other example tests check if the domain name is actually an IP address, which may indicate fraudulent activity since most users do not type IP addresses into the Web browser and the numeric IP address may be an attempt to hide a domain name for a fraudulent Web site. In this example, another of the fraud assessment tests checks for the word "update" in the domain name, as updating information is one of the many activities that fraudulent parties sending email prompt a user to perform; other words such as "signin" or "login" may similarly be used as part of fraud assessment tests in other embodiments. However, when using regular expression-based tests using these words, care should be used to make sure that a phrase may not be legitimately used as part of a larger word (e.g., so as to avoid penalizing a URL that includes the term "designing" when testing for the term "signin"). Furthermore, this example includes a fraud assessment test with a negative weight that is used to recognize legitimate domain names in which a user is trying to read email, such as for hostnames with "mail" or "webmail" as a subdomain (e.g., to prevent false positives for a domain name such as "mail.merchantLLL.com" or "mail.ispXXX.com", in which the incoming requests are based on a user viewing or otherwise interacting with a legitimate email sent by the target party to the user).

The example set of path-based tests 235 include a number of tests to apply to the value of the URL path. For example, some of the illustrated tests (such as the initial one that tests for three groups of three numeric digits each, separated by dashes) may be specific to Merchant LLL, such as if Merchant LLL uses that convention as part of URLs that it uses for some or all of its Web pages or other information resources. Since fraudulent parties may try to mimic this behavior on the fraudulent site (e.g., to make the fraudulent URL resemble a URL from the actual target Web site for Merchant LLL), one or more fraud assessment tests may check for it. In addition, these fraud assessment tests may check for the "merchantlll.com" term as part of the URL path, again due to its potential use by fraudulent parties in attempting to have their URLs resemble those of the legitimate target site. Other of these path-based tests are similar to the hostname-based tests in checking for terms that may reflect activities that users are requested to perform by the fraudulent party, such as "verify", "login", and "update", while other tests may check for other terms that are frequently used by such fraudulent parties such as "security", "sign-in-secure", etc. Furthermore, since some fraudulent parties may create the fraudulent site as part of an individual user directory on a Web server, which is rarely used by legitimate sites, one of the example fraud assessment tests checks if the URL is part of a user directory (i.e. based on the presence of the tilde character "~").

The example set of query string-based tests 245 include a number of tests to determine if a password was supplied or if certain activities (e.g., login, signin, etc.) were attempted. In this example, a common query string (i.e. "dest" or "url") associated with common legitimate redirection (e.g., as used by many webmail applications) is given a negative score. With respect to the example set 255 of tests that analyze the full URL value indicated for the referer field, the example tests check for various pages that are dynamically created using PHP ("PHP: Hypertext Preprocessor"), as PHP and other dynamically created pages (e.g., generated by scripts such as using CGI (or "Common Gateway Interface") or ASP (or "Active Server Pages")) are often used on fraudulent sites to process information supplied by potential victims. In addition, one of these example tests checks to see if the phrase "merchantlll" followed by "sign-in", "signin", or "login" is found anywhere in the URL value.

It will be appreciated that a variety of other types of fraud assessment tests may be specified and used in other embodiments, as discussed in greater detail below, including to analyze requests that are not HTTP-based and that do not include URLs or other URIs ("Uniform Resource Identifiers"). It will further be appreciated that such fraud assessment tests may be created in various ways (e.g., manual specification, automated analysis prior requests that were ultimately determined to be associated with fraudulent activities and/or legitimate activities in order to identify factors that are correlated with or otherwise associated with the fraudulent activities and/or legitimate activities, automated learning based on updating tests to reflect current requests that are assessed and to reflect identification of particular fraudulent parties and/or legitimate third-parties, etc.).

FIG. 2B illustrates various examples of filtering criteria that may be used to identify some information requests as being at least potentially fraudulent without further analysis, as well as to exclude some information requests from further analysis based on the request being considered to likely be legitimate (or, in some embodiments, to alter the analysis that is performed for such likely fraudulent and/or likely legitimate requests, such as to use different fraud assessment tests and/or to use different associated fraudulence thresholds). In this example, the illustrated filtering criteria includes lists of whitelisted and of blacklisted hostnames for third-party information source URLs indicated as values of the HTTP referer field for received requests. The whitelist 265 of referral URL hostnames may include, for example, hostnames of affiliates and partners that are authorized to make requests to the target Web site or that are otherwise believed to not be engaged in fraudulent activities. The whitelist may further include other types of parties, such as parties that have previously been verified as being legitimate (e.g., after manual review or other further analysis triggered by a previous automated identification of the party as potentially engaging in fraudulent activities, such as for false positives), and/or parties that are common referrers of legitimate information requests (e.g., popular search engines). In addition, in some embodiments, the target party may whitelist the target party's own domain name (e.g., in embodiments in which pharming attempts are not of concern). In this example, if a URL referral hostname for an information request matches an entry on the whitelist 265, the request will not be further analyzed and will be considered to not reflect fraudulent activities. In other embodiments, other actions may be taken, such as to exclude such a request from further analysis only if the request further does not match any entries on the blacklist 270 (although in some embodiments such overlap of entries between the whitelist 265 and blacklist 270 may not be allowed). In this example, there is also a whitelist 275 of user-agent client applications (e.g., search engine crawler bots), such that if a user-agent value matches an entry on the list 275, the request will not be further analyzed.

The blacklist 270, conversely, contains referral URL hostnames of sites that are known to at least be likely to engage in fraudulent activities, such as sites previously identified during automated analysis of fraudulent activities, sites previously identified based on manual review or other further analysis triggered by a previous automated identification of the party as potentially engaging in fraudulent activities, sites that were not previously automatically identified (e.g., that were false negatives), sites identified in information received from third-party sources of known or likely fraudulent sites, etc. In this example, if a URL referral hostname for an information request matches an entry on the blacklist 270, the request will not be further analyzed and will be considered to at least likely reflect fraudulent activities, although in other embodiments other actions may be taken. As previously noted, additional filtering criteria may be utilized in some embodiments, such as based on a resource requested as shown in an HTTP GET request or an IP address from which a request is received. Furthermore, in at least some embodiments only one or a subset of the lists 265, 270 and 275 may be used. As discussed in greater detail below, an embodiment of the Fraudulent Activity Detector system may use the various filtering criteria to analyze received information requests in order to attempt to identify suspected fraudulent activity associated with the information requests.

FIG. 2C-2F illustrates examples of several received information requests that may be analyzed to detect possible associated fraudulent activity, such as by an embodiment of the Fraudulent Activity Detector system that is using the fraud assessment rules and filtering criteria illustrated in FIGS. 2A and 2B. In these examples, the requests are HTTP requests received by the target party Merchant LLL from remote computers (e.g., from users' computing systems or fraudulent parties' computing systems), and the HTTP headers for the requests are illustrated. For example, FIG. 2C illustrates an example request to be analyzed that likely reflects fraudulent activities. Since the hostname of the referring third-party information source (in this example, "www.update.example-phisher.com") is not on the example whitelist 265 or blacklist 270 of FIG. 2B, and since the user-agent value is not on the example whitelist 275 in FIG. 2B, this request is not filtered and thus proceeds to be analyzed using the fraud assessment tests illustrated in FIG. 2A. In this example, the hostname contains a match for the regular expression "update" for one of the tests in the set 225, and thus is scored 1 point (the weighting associated with that test). Similarly, the URL path "/merchantlll.com/update.aspx" in this example matches the regular expressions for two tests in set 235, based on having the domain name in the URL path and the term "update" in it, and thus gets awarded 1.5 and 1 point respectively. There is no query string in this example, and none of the full URL tests apply. Thus, the total fraud assessment score for this request is 3.5 (1+1+1.5) in this example. If the fraud assessment threshold for this request is, for example, 2.5, this request would automatically be assessed as being from a suspect party that is potentially engaged in fraudulent activity (since the total fraud assessment score exceeds the fraud assessment threshold). It will be appreciated that in some embodiments the number of fraud assessment tests may be much larger (e.g., in the hundreds or thousands), and that the fraud assessment threshold would thus likely be correspondingly higher (or the associated weights with each test would be corresponding lower).

FIG. 2D illustrates another example HTTP request that is not filtered using the filtering criteria in FIG. 2B. During the subsequent automated assessment, the hostname ("www-.merchantlll-update.fraudulentYYY.net" in this example) is identified as matching two of the tests in the set 225 based on including both "update" and "merchantlll-" (which is not followed by ".com"), thus resulting in scores of 1 and 3 respectively. The URL path ("login/sign-in-secure.html") further matches two of the tests in the set 235 (e.g., "login" for 1.5 points, and "sign-in-secure" for 5 points), the query string ("action=login") matches one of the tests in the set 245 (i.e. "login" for 1 point), and none of the full URL tests are matched. This results in a total fraud assessment score for this request of 11.5, thus significantly exceeding the example threshold used in FIG. 2C. Therefore, the request illustrated in FIG. 2D is likely fraudulent, and may even trigger more stringent actions based on its high score (e.g., based on exceeding a second higher threshold value, such as 10).

Since the request illustrated in FIG. 2E is from the SeachEngineCCCBot user-agent client application, the request in this example is filtered as a legitimate request based on the whitelist 275 in FIG. 2B, and is not analyzed further. Finally, FIG. 2F illustrates a received request to the target party that is assessed as not likely to reflect fraudulent activities. Applying the filtering criteria of FIG. 2B, the request illustrated in FIG. 2F is not filtered because it does not match any of the filtering criteria. In this example, the user-agent header is present, so it receives no points for the user-agent test 207. Similarly, the Host header is not an IP address, and no points are awarded based on test 212. With respect to the URL value in the referer field, the request matches the test in the set 225 for having "webmail" at the beginning of the hostname, and thus receives a score of −3. The URL path in this example ("go.php") does not match any of the tests in set 235, but the query string ("url=http%3A%2F%2Fwww.merchantlll.com%2Forders%2Fview.html") matches the url/destination test in set 245 and earns a −3. None of the full URL tests match, and thus the total fraud assessment score for this request in this example is −6 (−3+−3), which indicates that this request is likely to be non-fraudulent.

Although not illustrated here for the sake of brevity, a variety of similar fraud assessment tests may be utilized in other embodiments. For example, fraud assessment tests may be utilized that have a term that reflects a misspelled word (e.g., a phonetic spelling of the domain or other word, a spelling that is missing a character, such as only one letter of a double letter, one or more transposed characters, etc.), that reflects different punctuation or other text symbols (e.g., adding a hyphen in "signin" to become "sign-in"), that have one or more characters substituted for similar looking characters (e.g., the lower case letter "L" replaced by an upper case "I" or the number one; the letter "o" replaced with the number zero, etc.), etc. In addition, fraud assessment tests may be utilized that further extend the types of tests illustrated in FIG. 2A. For example, additional fraud assessment tests may include regular expression-based tests that check for forms of an IP address other than decimal dot notation (e.g., hexadecimal, or decimal). As another example, regular expression-based tests may substitute one or more characters for URL-encoded characters (e.g., a reserved character that is represented by converting the character to its corresponding value in ASCII and then representing that value as a pair of hexadecimal digits preceded by a percent sign, such as "%2F"), while in other embodiments any URL-encoded characters may be decoded before applying the regular expression-based tests. The fraud assessment tests may also include regular expression-based testing of one or more trademarks associated with the target party. Furthermore, as previously noted, in some embodiments tests may be represented in manners other than via regular expressions.

In addition, some or all of the fraud assessment tests may further be based on information that is not contained in a request being analyzed. For example, some fraud assessment tests may determine if there was a previous request by the user for a primary resource (e.g., a Web page) before one or more secondary resources (e.g., images, JavaScript, CSS files, etc.) were requested. In addition, previous requests may be used to determine if a combination of multiple requests are likely to together represent fraudulent activities, such as based on repeated patterns of activities, or by a party retrieving sufficient information to allow creation of a fraudulent site. In some embodiments, some fraud assessment tests may further involve obtaining additional information not contained in the request from one or more third-parties (e.g., using whois to determine the country the referring hostname is registered in or the identity of the registrant, verifying an IP address using a reverse DNS lookup, obtaining information from a third-party information source to be analyzed, etc.) and using the obtained information in applying the fraud assessment test.

The fraud assessment tests and any associated scoring weights may be determined in various manners in various embodiments. For example, some of the fraud assessment tests may in some embodiments be manually determined by a human based on previous fraudulent attempts involving the target party or similar organizations, while in other embodiments some or all of the fraud assessment tests are automatically learned by the Fraudulent Activity Detector system, such as based on false positives/false negatives (e.g., as indicated by an employee of the target party), verification or other affirmation of automatic assessments of likely fraudulent activities and/or of likely legitimate activities, fraudulent attempts sent to a honeypot email address (an email address specifically set up to be harvested by and subsequently contacted by fraudulent parties), etc. Similarly, the scoring weights may be adjusted to reflect such automatic learning.

Thus, it will be appreciated that a variety of types of requests may be automatically analyzed in a variety of ways in various embodiments in order to assess likely fraudulent activities associated with requests, such as to protect confidential information associated with users by inhibiting such fraudulent activities.

Figure 3:
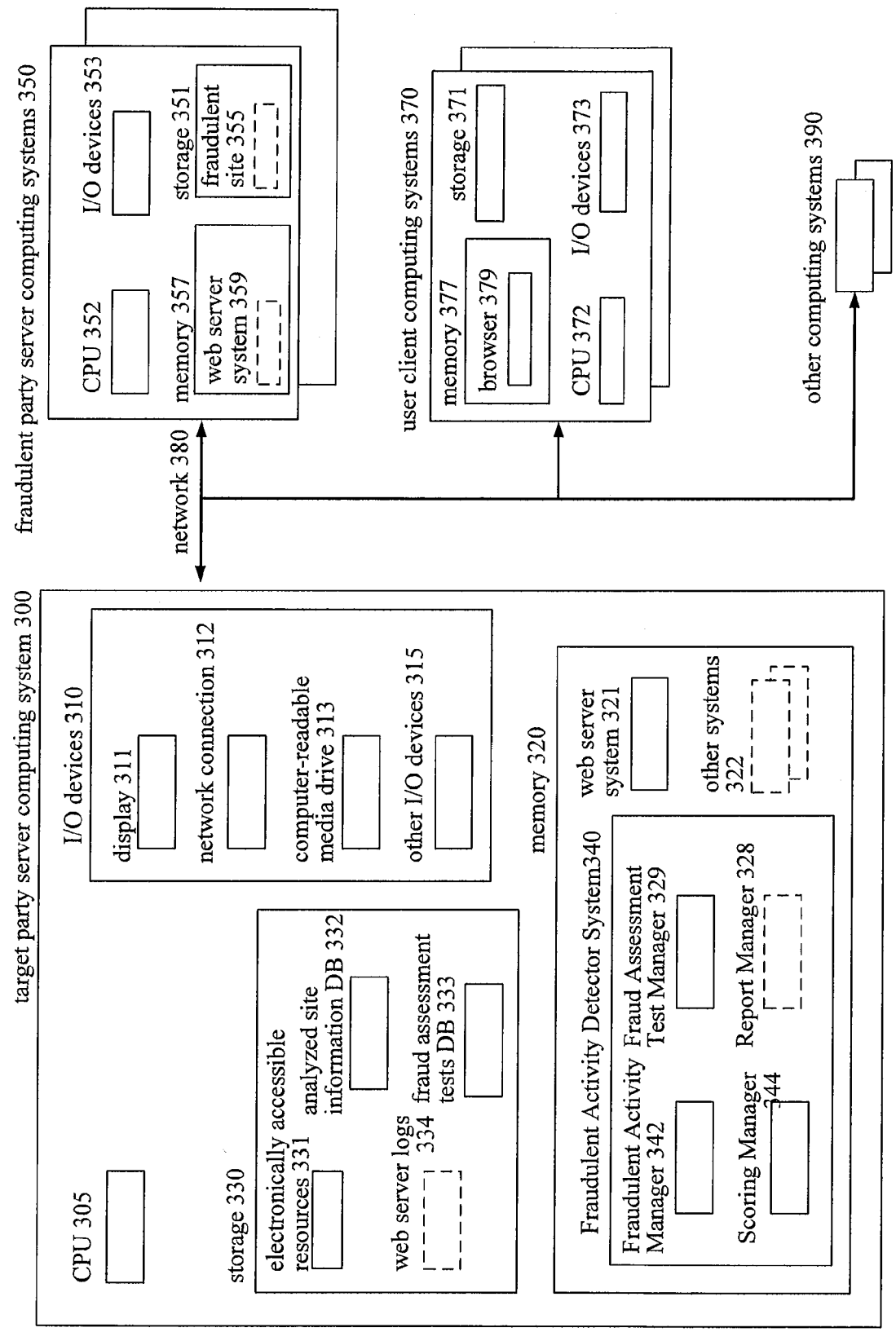
FIG. 3 is a block diagram illustrating a computing system suitable for executing an example embodiment of a Fraudulent Activity Detector system.

FIG. 3 is a block diagram of an example target party server computing system 300 suitable for executing an embodiment of the Fraudulent Activity Detector system 340 to detect and inhibit potential fraudulent activity. FIG. 3 further illustrates various user client computing systems 370 from which users may interact with the target party server computing system as well as other computing systems, fraudulent party server computing systems 350 that may operate so as to attempt to fraudulently obtain sensitive information from the users, and other computing systems 390 (e.g., computing systems of various partners and affiliates of the target party, computing system that provide information or functionality to the target party, etc.). In the illustrated embodiment, the server computing system 300 includes a CPU 305, various I/O components 310, storage 330, and memory 320. The I/O components include a display 311, network connection 312, computer-readable media drive 313 and other I/O devices 315 (e.g., a mouse, keyboard, etc.).

An embodiment of the Fraudulent Activity Detector system 340 is executing in memory 320, as is an optional Web server system 321 that provides one or more Web sites to users. In particular, users of the client computing systems 370 may interact with the Web server system 321 over the network 380 (e.g., via the Internet and/or the World Wide Web) via client-side browser applications 379 executing in memory 377 of the client computing systems, so as to send information requests for various electronically accessible resources 331 in storage 330 or other information available via the Web site. In some embodiments, users may further interact with the target server computing system 300 in other ways, such as to initiate access to one or more online services available from one or more optional other systems 322 (e.g., a Web store system, an online banking system, a stock trading system, etc.). In this example, the Web server system 321 responds to information requests by providing the requested information to the request senders, and may further generate one or more logs 334 of the requests on storage 330.

In the illustrated embodiment, the Fraudulent Activity Detector system 340 operates to automatically assess at least some of the information requests received by the Web server system 321, although in other embodiments the Fraudulent Activity Detector system 340 may instead interact with other systems that provide access to electronically accessible resources, such as one or more Web server systems and/or other types of systems that execute on one or more other remote computing systems (e.g., on one or more of the other computing systems 390). The information about the information requests to be analyzed may be obtained in various ways, such as based on interactions between the Fraudulent Activity Detector system and the Web server system 321 to obtain information about requests (e.g., before the requests are fulfilled, such as if the analysis is performed in realtime or near-realtime), or instead to analyze some or all requests after they are fulfilled based on retrieval of information about the requests from the logs 334.

The illustrated embodiment of the Fraudulent Activity Detector system 340 includes the following components: a Fraudulent Activity Manager component 342, which determines if fraudulent activity is suspected for requests; a Scoring Manager component 344, which assists the Fraudulent Activity Manager component by applying fraud assessment tests to information associated with requests; a Fraud Assessment Test Manager component 346, which facilitates creation and maintenance of fraud assessment tests; and an optional Report Manager component 348, which generates various reports based on the analyses performed by the Fraudulent Activity Manager component and optionally from other sources. The information about the fraud assessment tests that is used by the Scoring Manager component may be accessed in the illustrated embodiment from the fraud assessment tests ("DB") data structure 333 on memory 330, at least some of which may be added to the DB 333 by the Fraud Assessment Test Manager component. As the Fraudulent Activity Manager component performs analyses, information about analyzed sites (e.g., information about blacklists and/or whitelists of sites, information about results of analyses for various third-party information sources, etc.) is stored in the analyzed site DB 334 data structure, and may be used by the Report Manager component along with other information.

The fraudulent party server computing systems 350 may each contain a Web server system 359 executing in memory 357 to provide one or more fraudulent sites 355 to end-user client computing systems 370 using information stored in storage 351. Some of the material for the fraudulent site may be received by interacting with the target party server computing system 300 over the network 380, such as by posing as a client computing system to obtain information about the Web site provided by the Web server system 321, and some of the fraudulent site 355 may include links or other references to at least some of the electronically accessible resources 331 on the target party server computing system. In addition, the fraudulent party server computing system 350 may also interact with the target party server computing system 300 after obtaining confidential user information, such as to test login information fraudulently received from users and to access other confidential information about the users that may be stored by the Web server (e.g., in user accounts, not shown).

It will be appreciated that the illustrated computing systems are merely illustrative and are not intended to limit the scope of the present invention. The server computing systems 300 and 350 may instead each include multiple interacting computing systems or devices, and computing system 300 may be connected to other devices that are not illustrated, including through one or more networks such as the Internet, via the World Wide Web ("Web"), or via private networks (e.g., mobile communication networks, etc). More generally, a server or client computing system or device may comprise any combination of hardware or software that can interact, including (without limitation) desktop or other computers, network devices, PDAs ("Personal Digital Assistants"), cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the various Fraudulent Activity Detector system components may in some embodiments be combined in fewer components or distributed in additional components, and the functionality of some of the components may instead not be provided as part of the Fraudulent Activity Detector system and/or other additional functionality may be available.

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Some or all of the system components and/or data structures may also be stored (e.g., as software instructions or structured data) on a computer-readable medium, such as a hard disk, memory, a network, or a portable media article (e.g., a DVD or flash memory devices) to be read by an appropriate drive or via an appropriate connection. The system components and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present techniques may be practiced with other computer system configurations.

Figure 4:
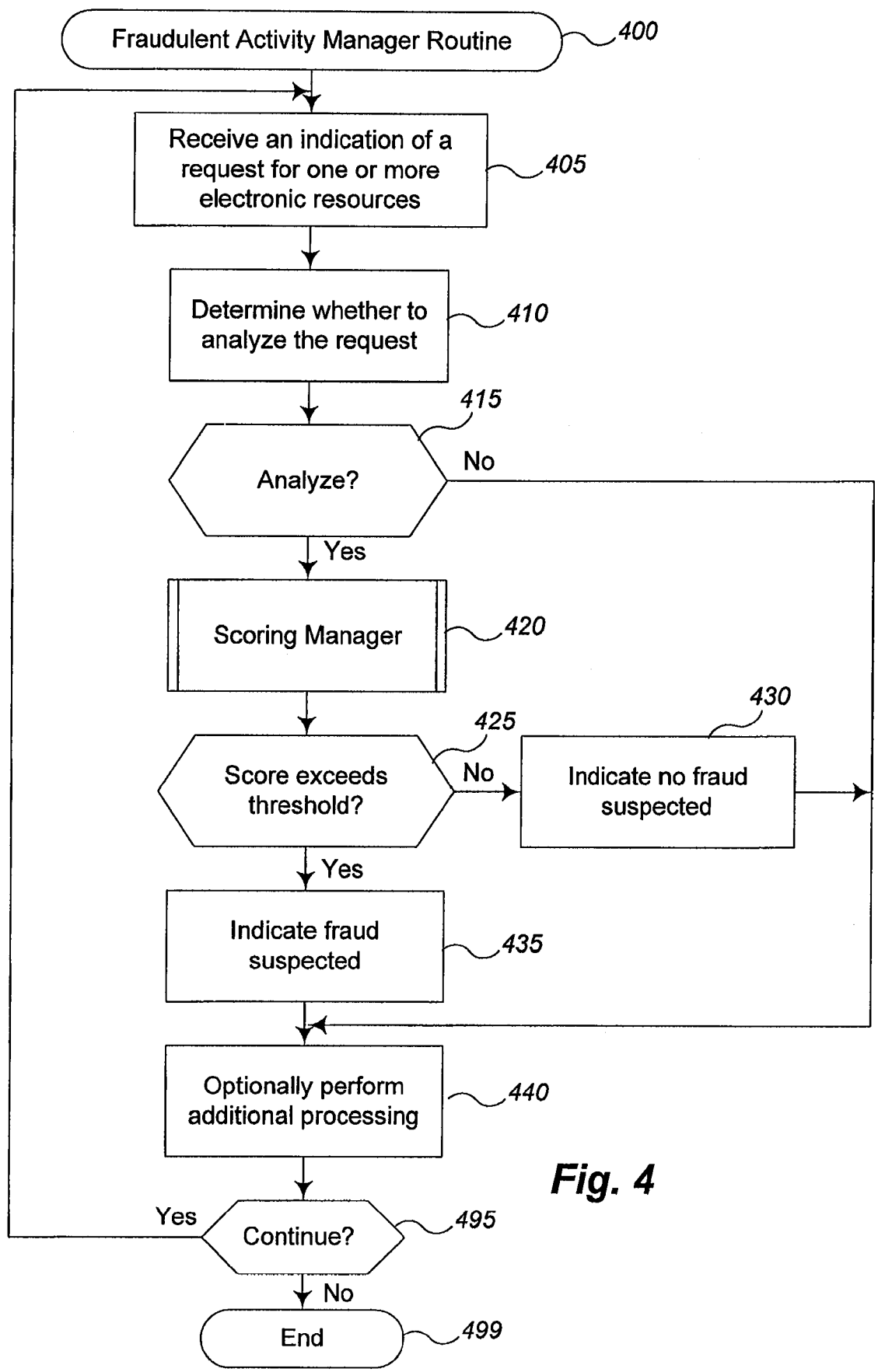
FIG. 4 is a flow diagram of an example embodiment of a Fraudulent Activity Manager routine.

FIG. 4 is a flow diagram of an example embodiment of a Fraudulent Activity Manager routine 400. The routine may, for example, be provided by execution of the Fraudulent Activity Manager component 342 of FIG. 3, such as to detect fraudulent activity associated with information requests being analyzed.

Figure 5:
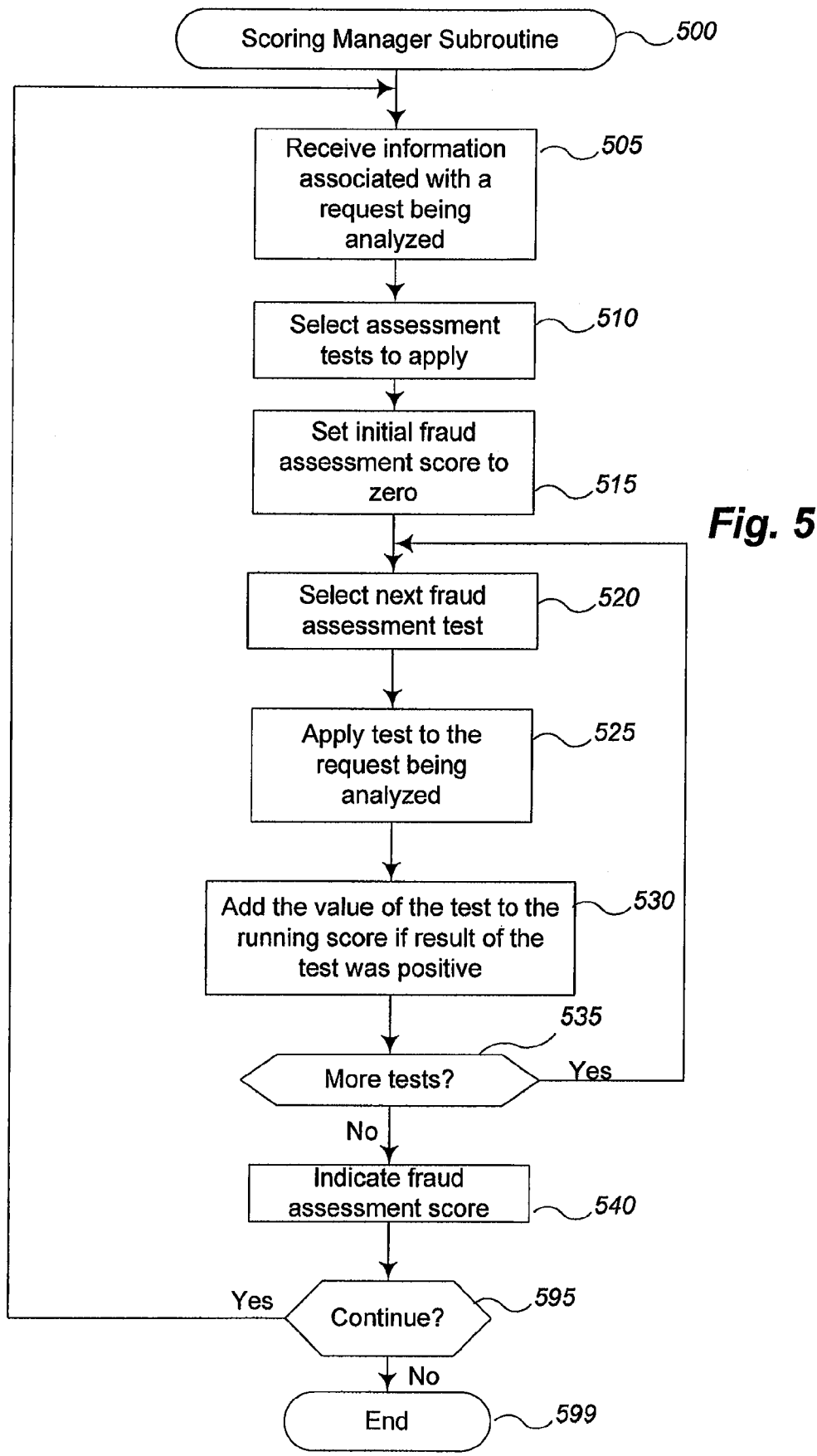
FIG. 5 is a flow diagram of an example embodiment of a Scoring Manager subroutine.

The routine begins at step 405, where the routine receives an indication of a request for one or more electronic resources (e.g., a Web page, an image, a video, etc.) or other information that may be automatically analyzed. After receiving the indication of the request, the routine continues to step 410, where the routine determines whether to analyze the request. For example, some requests may be filtered based on one or more types of filtering criteria, such as to exclude requests from known sources (e.g., search engines, partners or affiliates of the target party, internal requests) from analysis, or the routine may instead determine not to analyze the request based on other criteria (e.g., if the indicated request is received in realtime upon its receipt, but a decision is made based on one or more factors to delay it analysis). If it is determined in step 415 to not analyze the request, the routine proceeds to step 440. Otherwise, the routine continues to step 420 to execute a Scoring Manager routine, an embodiment of which is illustrated in FIG. 5. After executing the Scoring Manager and receiving an indication of an assessed total fraud assessment score for the request, the routine proceeds to step 425 where it determines whether the indicated score exceeds a fraudulence threshold selected for the request. In some embodiments, the fraudulence threshold is the same for all requests, and if so may be determined by the routine 400 during an initial start-up phase, while in other embodiments the fraudulence threshold may be dynamically determined for some or all requests (e.g., by receiving the fraudulence threshold from the Scoring Manager routine, or otherwise determining the fraudulence threshold for the request, not shown).

If it is determined in step 425 that the fraudulence threshold is exceeded, the routine continues to step 435 to indicate that fraudulent activities are suspected for the request, and if not proceeds to step 430 to indicate that fraudulent activities are not suspected. If the analysis is occurring in realtime with respect to receipt of the information request by a Web server or other information source, the indications in steps 430 and/or 435 may be made to that Web server or other information source for use in determining whether to fulfill the request. After steps 430 or 435, or if the request was determined not to be analyzed in step 415, the routine continues to step 440 to optionally perform additional processing. For example, the routine may generate a log of its activity or provide indications to other routines (not shown) to inhibit the fraudulent activity. Once the optional processing, if any, is performed, the routine determines whether to continue in step 495. If so, the routine returns to step 405, and if not ends at step 499.

As noted, after detecting potential fraudulent activity for one or more information requests, various actions may be taken to inhibit further fraudulent activity and to protect users. If the request is being analyzed in real-time, the request may be denied (e.g., to prevent a fraudulent site from obtaining information to resemble the legitimate site), or other types of information may be sent (e.g., a resource that will present a warning to a user associated with the request). If instead the request is being analyzed at a subsequent time, employees of the target party may, for example, be notified to manually initiate actions to have the fraudulent site shut down or made inaccessible (e.g., by reporting it to third-parties that may cause the access to be blocked). In other embodiments, one or more organizations involved in anti-fraudulent activities may be automatically contacted and appropriate action taken (e.g., to warn users of the fraudulent site, such as via a browser bar, or to block access to the fraudulent site in various ways, such as via blocking the DNS resolution of the fraudulent site's hostname). In addition, in some embodiments, emails or other electronic communications (e.g., instant messaging, text messaging, phone calls, etc.) may be sent to an associated user or to others (e.g., a hosting provider of the fraudulent site, an upstream Internet service provider, third-party organizations involved in Internet security, etc.).

FIG. 5 is a flow diagram of an example embodiment of a Scoring Manager subroutine 500. The subroutine may, for example, be provided by execution of the Scoring Manager component 344 of FIG. 3, and may be invoked at step 420 of FIG. 4, such as to apply one or more fraud assessment tests to information associated with a request for electronically accessible resources.

The routine begins at step 505, where the subroutine receives information associated with a request being analyzed (e.g., an HTTP header for the request, information about related prior or concurrent requests, etc.). After receiving the information, the subroutine continues to step 510, where the subroutine determines which assessment tests to apply. The assessment tests to apply may be the same for each request or may instead be selected dynamically (e.g., based on the type of electronically accessible resource requested, based on information received for the request, based on the IP address making the request, based on previous requests, etc.). In some embodiments, the subroutine may further select one or more groups of tests to apply together instead of individual fraud assessment tests. After determining the fraud assessment tests to apply, the subroutine proceeds to step 515, where it sets a fraud assessment score for the request to zero. The subroutine then continues to step 520, where it selects the next fraud assessment test to apply, beginning with the first. In some embodiments, the subroutine may select a next fraud assessment test to apply based on the results of one or more previous fraud assessment tests, such as if the next fraud assessment test uses results from one or more of the previous fraud assessment tests. For example, if a fraud assessment test determines that the Host header is not the domain name of the target party (e.g., the host is an IP address), then fraud assessment tests relating to the hostname in the referer may not be selected. Once a fraud assessment test is selected, the subroutine continues to step 525, where it applies the selected test to the request being analyzed. After applying the fraud assessment test, if the test was positive, the subroutine adds the value of the test to the cumulative fraud assessment score in step 530. Then, the subroutine determines in step 535 if there are more fraud assessment tests to apply. If so, the subroutine returns to step 520, and if not proceeds to step 540 to indicate the fraud assessment score. Once the score is indicated, the subroutine determines whether to continue in step 595. If so, the subroutine returns to step 505, and if not ends at step 599. While not illustrated here, in some embodiments the subroutine may further determine a fraudulence threshold to be used for the request, such as based on a type of the request and/or information obtained from the applying of the fraud assessment tests, and if so may further provide an indication of that fraudulence threshold in step 540.

Figure 6:
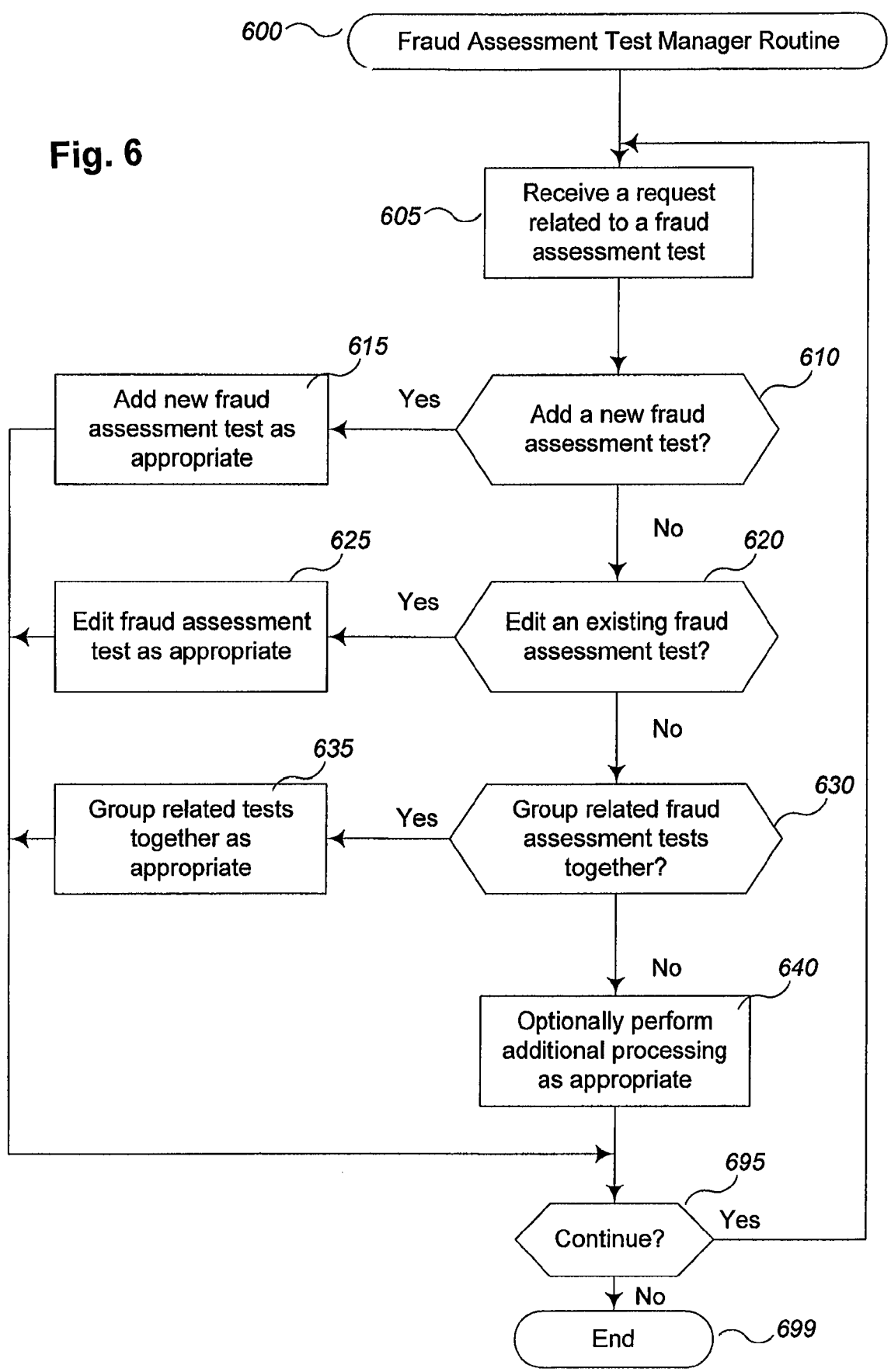
FIG. 6 is a flow diagram of an example embodiment of a Fraud Assessment Test Manager routine.

FIG. 6 is a flow diagram of an example embodiment of a Fraud Assessment Test Manager routine 600. The routine may, for example, be provided by execution of the Fraud Assessment Test Manager component 346 of FIG. 3, such as to perform various activities related to creating and maintaining fraud assessment tests.

The routine begins at step 605, where the routine receives a request related to one or more fraud assessment tests. The request may be received in various manners in various embodiments. For example, the request may be received from an employee of the target party, such as to create or modify a test, while in other embodiments the request may be generated automatically (e.g., by a component (not shown) that has analyzed prior information requests in order to learn additional tests and/or modify existing tests. After receiving the request, the routine proceeds to step 610, where the routine determines if the request was to add a new fraud assessment test. If so, the routine continues to step 615 to add a new fraud assessment test as indicated if appropriate, and if not proceeds to step 620.

If it is instead determined that the request was not to add a new fraud assessment test, the routine continues to step 620, where it determines if the request was to modify an existing fraud assessment test. If so, the routine continues to step 625 to modify one or more fraud assessment tests as indicated if appropriate, and if not proceeds to step 630. The edits to the existing assessment test may be of various types, such as modifying the logic of the fraud assessment test (e.g., a regular expression used for matching) and/or a score or weight assigned to the fraud assessment test.

If it is instead determined that the request was not to modify an existing fraud assessment test, the routine continues to step 630, where it determines if the request was to group related fraud assessment tests together. If so, the routine continues to step 635 to groups related tests together as indicated if appropriate, and if not proceeds to step 640. For example, the routine may group tests together that analyze the same types of information (e.g., a particular HTTP header, or the hostname of the referer), such as to more efficiently analyze information requests by applying related tests together or consecutively. The routine may also associate any dependencies that one or more tests have on other tests during step 635.

If it is instead determined that the request was not to group existing fraud assessment tests, the routine continues to step 640, where it optionally performs additional processing as appropriate. For example, the routine may delete a fraud assessment test, backup the fraud assessment tests, share or receive fraud assessment tests from other computing systems (e.g., other computing systems of the target party), etc. After steps 615, 625, 635 or 640, the routine continues to step 695 to determine whether to continue. If so, the routine returns to step 605, and if not ends at step 699.

Figure 7:
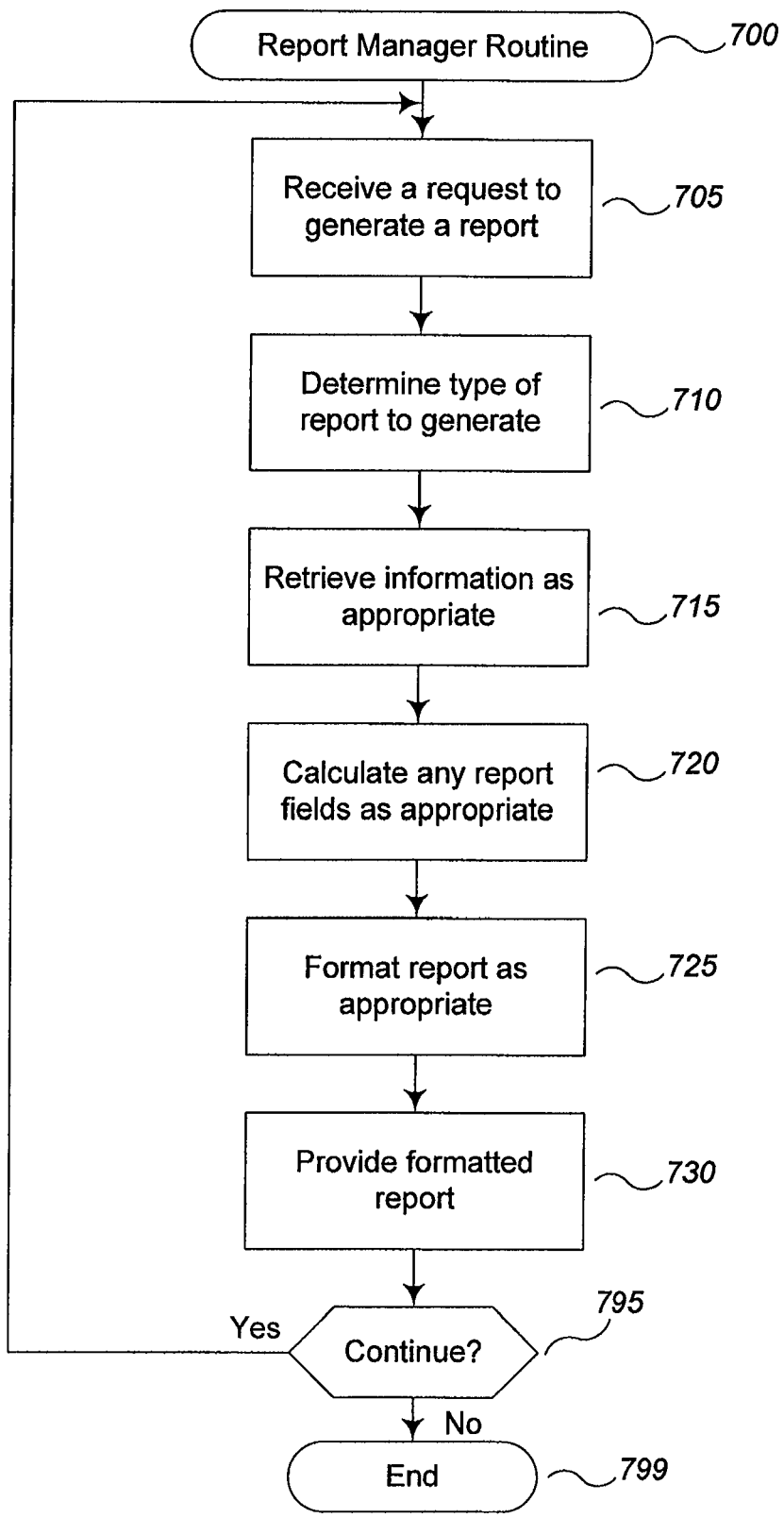
FIG. 7 is a flow diagram of an example embodiment of a Report Manager routine.

FIG. 7 is a flow diagram of an example embodiment of a Report Manager routine 700. The routine may, for example, be provided by execution of the Report Manager component 346 of FIG. 3, such as to generate reports for use by human operators so that they may take actions to inhibit suspected fraudulent activity.

The routine begins at step 705, where the routine receives a request to generate a report. The request may be generated automatically, such as periodically (e.g., every 15 minutes), after a predetermined number of suspected fraudulent activities have been detected, manually by a representative of the target party, etc. After receiving a request to generate a report, the routine determines the type of report to generate in step 710. As previously noted, a variety of types of reports may be generated, such as to allow manual actions to inhibit the detected fraudulent activity to be taken or to determine the effectiveness of various actions taken to inhibit fraudulent activity. In some embodiments, the reports may aggregate information about multiple requests received from a user (or group of related users) and/or that are initiated by a third-party information source. The reports may further include other related information of use in determining whether a particular third party is likely to be engaged in fraudulent activities, such as information available from the third party, information available from others regarding the third party (e.g., credit reports, business analyses, etc.), information about other activities that a target system has had with the third party (e.g., any contractual or other relationships that exist, any past problems involving information and/or services provided to and/or from the third party, interactions with users that are triggered by or otherwise related to the third party, such as requests for customer service or other help, etc.), etc. After determining the type of report to generate, the routine continues to step 715, where the routine retrieves the information as appropriate. The information may be retrieved, for example, from the web server logs 334 and the Analyzed Site Information DB 332 of FIG. 3. Additional information from other external sources may also be included in the reports as appropriate. Once the information is retrieved, the routine calculates any report fields as appropriate, such as by aggregating information about multiple requests and/or from multiple sources. For example, the routine may calculate the number of times that a particular third-party information source has initiated a request to the target party, or the routine may calculate the percentage of requests involving the third party in which fraudulent activity was suspected. After calculating the fields as appropriate, the routine continues to step 725, where it formats the report as appropriate, including to group related types of information together. For example, the routine may aggregate together all requests with the same or similar host names. After formatting the report, the routine continues to step 730, where it provides the formatted report (e.g., to a human representative of the target party, to another routine for batch processing of taking actions taken to inhibit fraudulent activity, etc.). Once the routine provides the formatted report, the routine proceeds to step 795, where it determines whether to continue. If so, the routine returns to step 705, and if not ends at 799.

While various exemplary details have been included above, embodiments of the Fraudulent Activity Detector system may be implemented in various other manners in other embodiments. For example, as previously noted, the system may be used to analyze requests using protocols other than HTTP. When using other protocols, various techniques may be utilized to supplement the information provided by default with the protocol (e.g., client-side scripting, a client-side applet, extensions to the protocol, etc.), such as to enable information regarding the third-party information source with which the user was interacting to initiate the request to be received for analysis. Similarly, the techniques may be applied to information sources other than a Web server, such as a file server, an application server (e.g., providing one or more Web services) or an email server.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
   receiving, by a configured computing system associated with an electronic information service having a first Web site, a request from a user for information available from the electronic information service about an account of the user with the electronic information service, the request including an indication of a third-party information source having a second Web site with which the user was interacting, the interacting of the user with the second Web site initiating the request for the information from the electronic information service;

obtaining, by the configured computing system, information about the third-party information source indicated in the request, the third-party information source being distinct from the electronic information service;

assessing, by the configured computing system, the third-party information source by applying multiple fraud assessment tests and by computing a fraud assessment score for the third-party information source based on the applied fraud assessment tests;

determining, by the configured computing system, whether the third-party information source indicated in the request is suspect based at least in part on whether the computed fraud assessment score for the third-party information source exceeds a fraudulence threshold; and if it is determined that the third-party information source indicated in the request is suspect, taking one or more actions to inhibit fraudulent activities by the third-party information source, and otherwise not taking the one or more actions.

2. The method of claim 1 wherein the interacting of the user with the second Web site includes selecting a link on a Web page of the second Web site that directs a Web browser of the user to request indicated information from the first Web site as part of the request.

3. The method of claim 1 wherein the second Web site is a fraudulent site that resembles the first Web site in order to attempt to obtain information about users that have accounts with the first Web site, the second Web site including one or more Web pages to prompt users to enter login information corresponding to accounts on the first Web site.

4. The method of claim 1 wherein the second Web site includes one or more Web pages to prompt users to enter information about financial accounts of the users.

5. The method of claim 2 wherein the indication of the third-party information source in the request is an indication sent by the Web browser of the user to the first Web site that includes a domain name of the second Web site, and wherein the obtaining of the information about the third-party information source includes obtaining information from one or more source other than the request.

6. The method of claim 5 wherein the indication sent by the Web browser of the user to the first Web site further is part of at least one of an absolute Uniform Resource Locator (URL) specific to the Web page of the second Web site and of a HyperText Transfer Protocol (HTTP) referer field.

7. The method of claim 2 wherein the third-party information source is not authorized to include the link on the Web page, and wherein the third-party information source is determined to be suspect.

8. The method of claim 1 wherein the request is one of a plurality of requests received by the configured computing system, wherein the method further comprises selecting the request to be assessed based on information specific to the request, and excluding one or more other requests of the plurality from being assessed based on third-party information sources indicated for those excluded requests being previously determined to be authorized to perform those excluded requests.

9. The method of claim 1 wherein the applying of at least some of the multiple fraud assessment tests to assess the third-party information source includes analyzing information related to the request other than the indication of the third-party information source.

10. The method of claim 1 wherein the applying of at least some of the multiple fraud assessment tests to assess the third-party information source includes analyzing the indication of the third-party information source.

11. The method of claim 10 wherein the indication of the third-party information source includes multiple portions, and wherein the multiple fraud assessment tests applied to assess the third-party information source include at least one fraud assessment test to assess each of multiple of the portions of the third-party information source indication.

12. The method of claim 1 wherein the assessing of the third-party information source includes identifying multiple requests from multiple users that each indicate the third-party information source and performing the assessing of the third-party information source based at least in part on the multiple requests.

13. The method of claim 1 wherein the assessing of the third-party information source includes identifying multiple other requests that each indicate a third-party information source similar to the third-party information source indicated in the request and performing the assessing of the third-party information source for the request based at least in part on a pattern identified for the multiple requests.

14. The method of claim 1 wherein the obtaining of the information about the third-party information source includes gathering additional information about that third-party information source that is not part of the request, and wherein the assessing of the third-party information source is further based at least in part on the gathered additional information.

15. The method of claim 1 wherein the third-party information source is determined to be suspect, and the taking of the one or more actions to inhibit fraudulent activities by the third-party information source includes initiating a shutdown of the third-party information source.

16. The method of claim 1 wherein the third-party information source is determined to be suspect, and the taking of the one or more actions to inhibit fraudulent activities by the third-party information source includes suspending use of the account for the user.

17. The method of claim 1 wherein the third-party information source is determined to be suspect, and the taking of the one or more actions to inhibit fraudulent activities by the third-party information source includes notifying the user that confidential information regarding the user may no longer be secure.

18. The method of claim 1 wherein the third-party information source indicated in the one request is determined to be suspect, and the taking of the one or more actions to inhibit fraudulent activities by the third-party information source indicated in the one request includes providing information about the third-party information source for further manual review.

19. A non-transitory computer-readable medium whose contents include stored instructions that, when executed, configure a computing device associated with an electronic information service to automatically inhibit attempts to obtain unauthorized access to information about users, by performing a method comprising:

receiving, by the configured computing device, a request from a user for information available from the electronic information service, wherein the electronic information service has one or more first Web pages, and wherein the request includes an indication of a third-party information source that is distinct from the electronic information service and that has one or more second Web pages used to initiate the request;

assessing, by the configured computing device, the received request based at least in part on the indication of the third-party information source, the assessing including generating an assessment that the received request reflects activities of a party other than the user to obtain unauthorized access to information about users of the electronic information service; and initiating, based on the generated assessment, one or more activities to inhibit the other party from obtaining the unauthorized access to the information about the users of the electronic information service.

20. The non-transitory computer-readable medium of claim 19 wherein the user is one of multiple users of the electronic information service.

21. The non-transitory computer-readable medium of claim 20 wherein the one or more second Web pages are provided by the other party to fraudulently mimic at least one of the first Web pages, and wherein the indication of the third-party information source includes an indication of a URL associated with at least one of the other Web pages of the second group.

22. The non-transitory computer-readable medium of claim 19 wherein the assessing of the received request includes applying one or more fraud assessment tests and generating a fraud assessment score for the third-party information source based at least in part on the applied fraud assessment tests.

23. The non-transitory computer-readable medium of claim 19 wherein the computer-readable medium is a memory of the configured computing device.

24. A computing device configured to automatically inhibit attempts to obtain unauthorized access to information about users, comprising:

a hardware processor; and a fraudulent activity detector system configured to, when executed by the hardware processor, analyze a request on behalf of a user for available information from an information service having one or more first Web cages, wherein the request indicates a third-party information source having one or more distinct second Web pages used to initiate the request, by:

automatically assessing the third-party information source indicated in the received request and determining that the third-party information source is engaged in fraudulent activities to obtain unauthorized access to information about the user, the assessing including applying at least one fraud assessment test; and initiating, based on the determining, one or more actions to inhibit the fraudulent activities by the third-party information source.

25. The computing device of claim 24 wherein the fraudulent activity detector system includes instructions for execution in memory of the computing device.

26. The computing device of claim 24 wherein the fraudulent activity detector system consists of a means for performing the analyzing of the requests.

* * * * *

UNITED STATES PATENT AND TRADEMARK OFFICE
CERTIFICATE OF CORRECTION

| | |
|---|---|
| PATENT NO. | : 8,763,116 B1 |
| APPLICATION NO. | : 13/163526 |
| DATED | : June 24, 2014 |
| INVENTOR(S) | : Richendra Khanna et al. |

It is certified that error appears in the above-identified patent and that said Letters Patent is hereby corrected as shown below:

In the Claims

Claim 24, Column 24, Line 11:
"information service having one or more first Web cages," should read, --information service having one or more first Web pages,--.

Signed and Sealed this
Tenth Day of February, 2015

Michelle K. Lee
*Deputy Director of the United States Patent and Trademark Office*